United States Patent [19]

McKechnie

[11] Patent Number: 4,627,170

[45] Date of Patent: Dec. 9, 1986

[54] SHAFT GUIDE ALIGNMENT MEASUREMENT

[75] Inventor: Ronald M. K. McKechnie, Vaal Reefs, South Africa

[73] Assignee: Vaal Reefs Exploration and Mining Co., Transvaal, South Africa

[21] Appl. No.: 788,446

[22] Filed: Oct. 17, 1985

[30] Foreign Application Priority Data

Oct. 17, 1984 [ZA] South Africa ........................ 84/8102

[51] Int. Cl.$^4$ ................................................ G01B 7/31

[52] U.S. Cl. ................................ 33/181 R; 33/178 F; 33/533; 33/544; 33/180 R

[58] Field of Search ................. 33/181 R, 180 R, 286, 33/287, 304, 533, 178 F, 544

[56] References Cited

U.S. PATENT DOCUMENTS 3,882,606 5/1975 Kaenel et al. ......................... 33/544
3,886,665 6/1975 Lowen .................................. 33/544
4,048,009 9/1977 Weilbacher ........................... 33/533
4,571,848 2/1986 Krütz et al. ....................... 33/178 F
4,583,297 4/1986 Jewell .................................. 33/533

*Primary Examiner*—Willis Little
*Attorney, Agent, or Firm*—Cushman, Darby & Cushman

[57] ABSTRACT

A conveyance guide alignment measuring device adapted to track along conveyance guides in a shaft, such as a lift shaft, comprises a substantially rigid frame, roller assemblies at either end of the frame and a sub-frame movably suspended from the frame. A pair of opposed roller assemblies are mounted in the sub-frame. The roller assemblies include a fixed assembly which engages a reference guide in the shaft and an outwardly biased assembly which engages an opposed conveyance guide. The sub-frame, being freely suspended, follows any misalignment in the guides and motion sensors are mounted to detect and measure relative motion of the frame, the sub-frame and the roller assemblies mounted on the sub-frame whereby predetermined alignment parameters of the conveyance guides may be determined.

9 Claims, 8 Drawing Figures

SHAFT GUIDE ALIGNMENT MEASUREMENT

BACKGROUND TO THE INVENTION

This invention relates to a conveyance guide alignment measuring device for conveyance guides in mine and lift shafts.

One of the causes of lateral vibration of conveyances such as skips and lifts is the misalignment of the conveyance guides extending along the shaft.

It is an object of this invention to provided a device by means of which shaft guide alignment can be measured in an effective manner.

SUMMARY OF THE INVENTION

A conveyance guide alignment measuring device adapted to track along conveyance guides extending along a shaft comprises a substantially rigid frame, opposed roller assemblies at either end of the frame, the assembly on one side of the frame being rigidly mounted on the frame for engagement with a reference guide and the assembly opposed thereto on the other side of the frame being biased resiliently outwardly for engagement with a second guide, a sub-frame movably suspended from the frame and including a roller assembly rigidly mounted on the sub-frame for engagement with the reference guide and a roller assembly biased outwardly from the sub-frame for engagement with the second guide and motion sensors mounted to detect and measure relative motion of the frame, the sub-frame and the roller assemblies mounted on the sub-frame, whereby predetermined alignment parameters of a pair of conveyance guides may be determined.

The sensors may comprise linear transducers or strain gauges mounted on flexure strips and the alignment parameters which may be determined include:

straightness of the guides relatively to a first vertical plane intersecting the ideal vertical axes of the guides; the gauge between guides;

straightness of the guides in planes at right angles to the first vertical plane; and vertical continuity of the joints between guides in both the first and the second planes.

The frame may conveniently be of a truss-configuration of suitable metal sections such as square tubing and of a length twice the spacing between shaft lining buntons.

The roller assembly mounted on the sub-frame may be mounted in trucks which are freely movable with respect to the sub-frame and the motion sensors may include at least one sensor adapted to determine and measure relative movement of the trucks and the sub-frame.

The trucks may include guide rollers and at least one measurement roller rotatably mounted on a sprung axle which is movable relatively to the truck and the motion sensors may include at least one sensor adapted to determine and measure relative movement of the measuring roller axle and the truck.

The biased sets of rollers may be biased by means of fluid pressure which may be controllable.

DESCRIPTION OF THE DRAWINGS

The invention will be further described with reference to the accompanying drawings in which.

DESCRIPTION OF AN EMBODIMENT OF THE INVENTION

Figure 2:
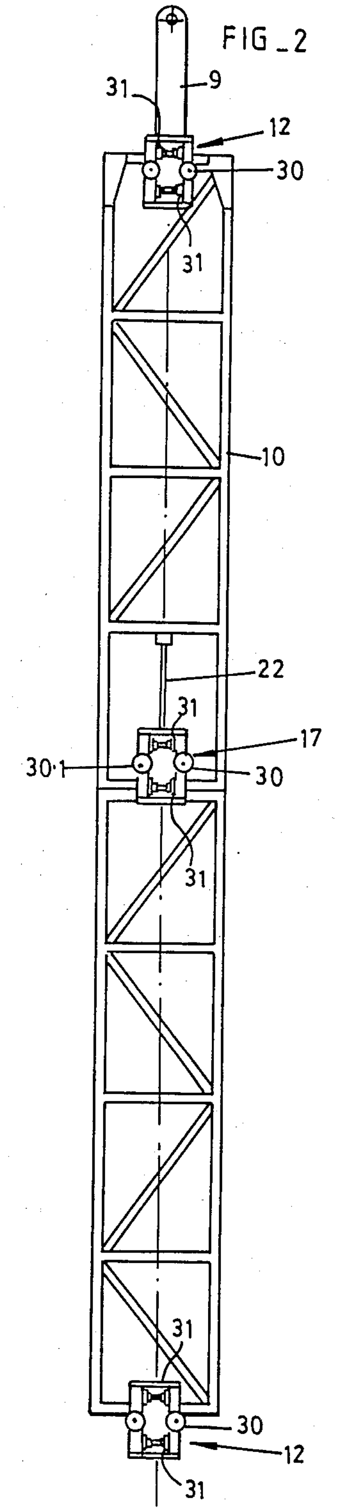
FIG. 2 is an end elevation of FIG. 1.
Figure 1:
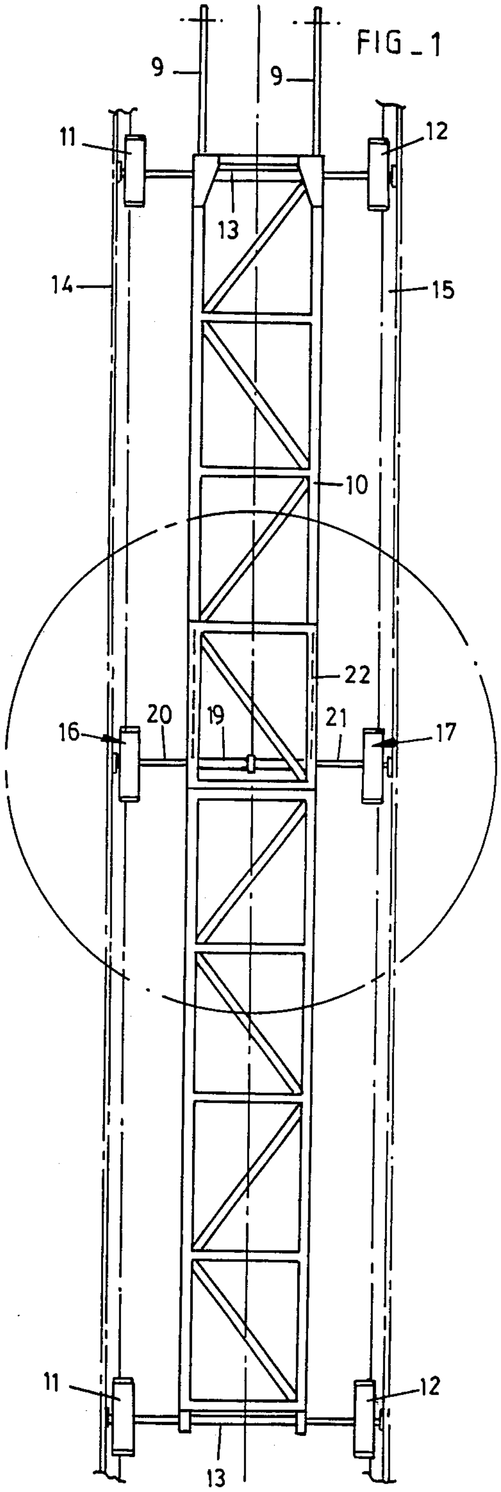
FIG. 1 is a diagrammatic side elevation of the alignment measuring device of the invention located between a pair of conveyance guides in a shaft.
Figure 3:
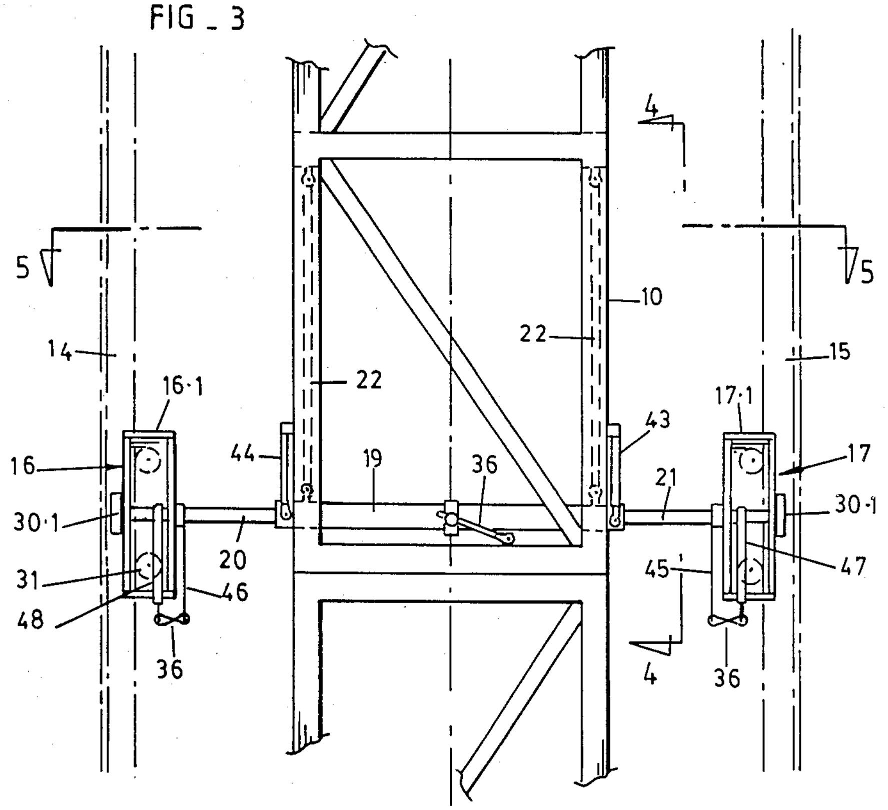
FIG. 3 is an enlarged view of the circled portion of FIG. 1.
Figure 4:
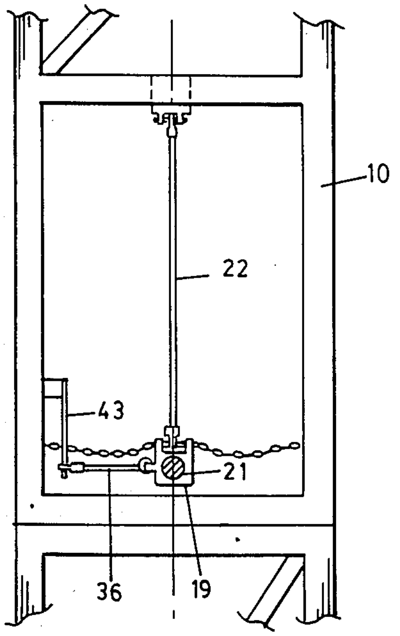
FIG. 4 is a section in side elevation on the line 4—4 in FIG. 3.

The conveyance guide alignment measuring device illustrated in FIGS. 1 and 2 consists of an elongated frame 10 fabricated from square tubing in a truss-configuration. The frame 10 is adapted for suspension below a conveyance such as a lift cage or a skip in a shaft by means of hangers 9. Opposed pairs of roller assemblies 11 and 12 are mounted at the top and bottom of the frame 10 by means of pneumatic piston and cylinder arrangements. The roller assemblies 12 are rigidly mounted relatively to the frame 10 by means of fixed connecting rods extending between the rigidly connected cylinders 13 and the roller assemblies 12 while the roller assemblies 11 are carried on piston rods extending into the cylinders 13. Under the application of pneumatic pressure, the roller assemblies 11 are pushed outwardly so that the frame 10 may be located between a pair of conveyance guides 14 and 15 by the outwardly acting pneumatic bias pressure.

Towards the middle of the frame 10, two more roller assemblies 16 and 17 are mounted on a pneumatice piston and cylinder arrangement 19 by means of a piston rod 20 and a fixed rod 21. The piston and cylinder arrangement 19 is suspended by means of rods 22 from crossbars in the frame 10 and constitutes a suspended sub-frame. The rods 22 are provided with spherical joints at both ends to enable relatively free pendulous movement of the sub-frame.

Figure 6:
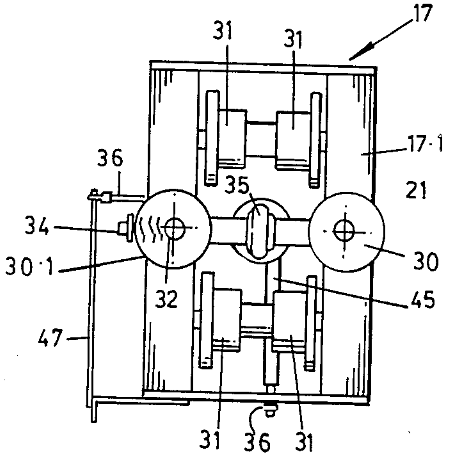
FIG. 6 is an end elevation of a roller assembly truck in the direction of the arrow 6 in FIG. 5.
Figure 7:
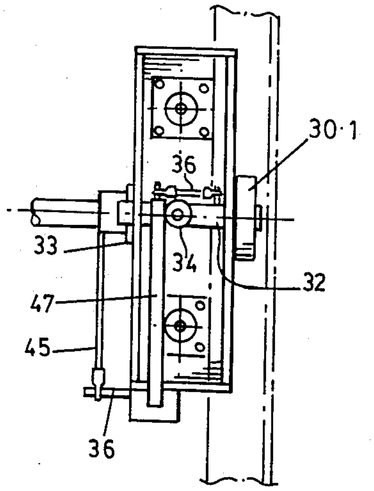
FIG. 7 is a side elevation of the truck of FIG. 6.
Figure 8:
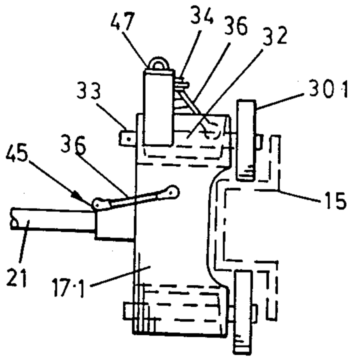
FIG. 8 is an under plan view of the truck of FIGS. 6 and 7.

The roller assemblies are mounted in trucks which include guide rollers adapted to engage the faces of the conveyance guides 14 and 15 and lateral rollers or wheels mounted to engage the sides of the guides 14 and 15. In the assemblies 16 and 17, one of which (17) is illustrated in FIGS. 6, 7 and 8, one of the lateral rollers is rotatably mounted on a sprung axle while the other lateral roller and the guide rollers 31 are mounted on fixed axles in the trucks. The sprung lateral roller 30.1 is mounted on an axle 32 which is pivoted at 33 and fixed to the truck 17.1 by means of a compression spring 34 acting inwardly to bias the lateral wheel 30.1 inwardly against the side of the guide. The guide rollers 31 engage the face of the guide and are urged against the guide by pneumatic bias pressure acting through the piston and cylinder arrangement 19.

Figure 5:
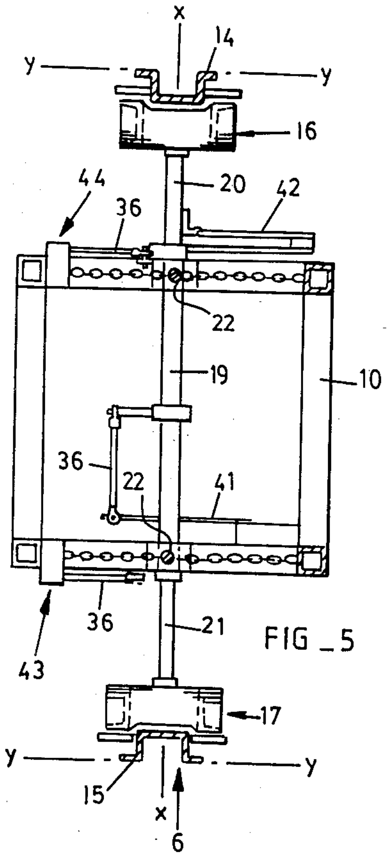
FIG. 5 is a plane section on the line 5—5 in FIG. 3.

In FIG. 5 the ideal vertical axes or planes X—X and Y—Y extending through the device of the invention are shown.

A system of 8 strain gauges mounted on flexure strips 41 to 48 is provided and in use, the strain gauges are connected, each by a different channel, to an 8 channel data recorder. The data recorded from the various strain gauges indicate the following alignment parameters:

Flexure strip 41: Deviation of a guide from the plane X—X;

Flexure strip 42: The gauge between guides;

Flexure strip 43: Deviation of the guide 15 from the plane Y—Y;

Flexure strip 44: Deviation of the guide 14 from the plane Y—Y;

Flexure strip 45: Joint discontinuity-deviation in the direction of the plane X—X-misaligned front guide faces across joints-guide 15;

Flexure strip 46: Joint discontinuity-deviation in the direction of the plane X—X-misaligned front guide faces across joints-guide 14;

Flexure strip 47: Joint discontinuity-deviation in the direction of the plane Y—Y-misaligned side faces across joints-guide 15;

Flexure strip 48: Joint discontinuity-deviation in the direction of the plane Y—Y-misaligned side faces across joints-guide 14.

In order to ensure relatively accurate measurement, all the link rod ends are fitted with spherical bearings. This applies to the connections 35 between the trucks 16.1 and 17.1 and the link rods 20 and 21 as well as to the link rods 36 connecting the flexure strips 41 to 48 to their various points of connection.

In practice, the fixed roller assemblies act as a reference to the roller assemblies on the other side so that the conveyance guide 15 can be said to serve as a reference guide. The biased rollers are pushed out under a controlled load from the pneumatic cylinders 13 and 19. The use of spherical ball ended rods 22 to suspend the sub-frame constituted by the piston and cylinder arrangement 19 allows the sub-frame to "float" relatively to the frame and the roller assemblies 16 and 17, being mounted on spherical ball ended universal joints 35 are able to "float" relatively to the sub-frame.

An additional aspect of using pneumatic cylinders to displace the roller assemblies is that stiffness variations in the guides can be measured by increasing the pneumatic pressure above that required merely to locate the rollers until, during movement of the frame 10 along the guides 14 and 15, a periodic response in the guide gauge measurement is observed. The wavelength of the response will correspond to the shaft lining bunton spacing. Guide gauge errors will mask the periodic signal to some extent, but by subtracting the signals obtained during two passes using different bias pressure, stiffness variation in the guides 14 and 15 can be obtained.

In practical tests undertaken in skip shafts in a gold mine, the device described above was suspended below a skip cage and measurements were recorded at a winding speed of approximately 2 $m.s^{-1}$ travelling both up and down the shaft. The device was set up initially so that the fixed roller assemblies contacted the north guide which therefore served as a reference guide and the tests were repeated after the device had been rotated 180° so that the fixed roller assemblies contacted the south side. In this way the misalignment in the plane of the guides could be measured for both guides. Calibration was undertaken in the head gear by means of slip gauges of known thickness placed between the rollers and the guide.

Where a moving beam, such as the frame 10, of a length less or more than the most important regular periodic deviation is used for measurement, a value less than the peak to peak amplitude of the periodic deviation may be measured and an attenuation of errors occuring across the guide may take place. For this reason it is important to choose a moving beam length equal to the most important wave length, that is twice the bunton spacing. As a result of the use of buntons to line the shaft, a periodic deviation tends to be imposed on the conveyance guides by the connections between buntons.

With the device described above, the in plane measurement is done on only one guide at a time, namely the reference guide. It is possible to adapt the device to measure the in plane misalignment on both guides simultaneously, but this would require extra transducers measuring the top roller and bottom roller guide gauge and summing and differencing the resultant four signals appropriately to derive the value for the non-reference guide. For this approach a recorder with a capacity greater than 8 channels will be required. Such an adaptation is desirable since the weight and length of the device make its handling very awkward and time consuming. Simultaneous measurements will virtually halve the measurement time required.

By suitable mathematical analysis of the data recorded, it is possible to prepare adjustment instructions for shaft maintenance crews or for construction crews engaged in the initial constructon of conveyance shafts.

I claim:

1. A conveyance guide alignment measuring device adapted to track along conveyance guides extending along a shaft comprising a substantially rigid frame, opposed roller assemblies at either end of the frame, the assemblies on one side of the frame being rigidly mounted on the frame for engagement with a reference guide and the assemblies opposed thereto on the other side of the frame being biased resiliently outwardly for engagement with a second guide, a sub-frame movably suspended from the frame and including a roller assembly rigidly mounted on the sub-frame for engagement with the reference guide and a roller assembly biased outwardly from the sub-frame for engagement with the second guide, and motion sensors mounted to detect and measure relative motion of the frame, the sub-frame and the roller assemblies mounted on the sub-frame.

2. A measuring device according to claim 1 in which the roller assemblies mounted on the sub-frame are mounted in trucks which are freely movable with respect to the sub-frame, the motion sensors including at least one sensor adapted to determine and measure the relative movement of the trucks and the sub-frame.

3. A measuring device according to claim 2 in which the trucks include guide rollers and at least one measuring roller rotatably mounted on a resiliently inwardly biased axle which is movable relatively to the truck and the motion sensors including at least one sensor adapted to detect and measure relative movement of the measuring roller axle and the truck.

4. A measuring device according to claim 1 which is adapted to measure one or more of the following alignment parameters:

straightness of the guides relatively to a first vertical plane intersecting the ideal vertical axes of the guides;

the gauge between guides;

straightness of the guides in planes at right angles to the first vertical plane; and vertical continuity of the joints between guides in both the first and the second planes.

5. A measuring device according to claim 1 in which the bias pressure of the biased roller assemblies is controllable.

6. A measuring device according to claim 1 in which the biased roller assemblies are pneumatically biased.

7. A measuring device according to claim 1 which is adapted to be suspended lengthwise below a shaft conveyance.

8. A measuring device according to claim 1 in which the frame is of a truss-configuration.

9. A measuring device according to claim 1 in which the length of the frame is of a length twice the spacing between shaft lining buntons.

* * * * *